United States Patent
Kulkarni et al.

[11] Patent Number: 6,055,629
[45] Date of Patent: Apr. 25, 2000

[54] PREDICTING FOR ALL BRANCH INSTRUCTIONS IN A BUNCH BASED ON HISTORY REGISTER UPDATED ONCE FOR ALL OF ANY TAKEN BRANCHES IN A BUNCH

[75] Inventors: Paritosh M. Kulkarni, Campbell; Richard Reeve, Los Gatos; Nirmal R. Saxena, Los Altos Hills, all of Calif.

[73] Assignee: Fujitsu, Ltd., Japan

[21] Appl. No.: 09/233,695

[22] Filed: Jan. 19, 1999

Related U.S. Application Data

[62] Division of application No. 08/998,294, Dec. 24, 1997, Pat. No. 5,896,529, which is a continuation of application No. 08/601,744, Feb. 15, 1996, Pat. No. 5,742,805.

[51] Int. Cl.$^7$ ....................................................... G06F 9/38
[52] U.S. Cl. .......................... 712/239; 712/240; 712/215
[58] Field of Search ................................... 712/239, 240, 712/215

[56] References Cited

U.S. PATENT DOCUMENTS

| | | | |
|---|---|---|---|
| 5,553,253 | 9/1996 | Pan et al. ................................. | 712/240 |
| 5,687,360 | 11/1997 | Chang ...................................... | 712/240 |
| 5,758,143 | 5/1998 | Levitan .................................... | 712/240 |
| 5,794,063 | 8/1998 | Favor ........................................ | 712/23 |
| 5,805,878 | 9/1998 | Rahman et al. ......................... | 712/239 |
| 5,815,699 | 9/1998 | Puziol et al. ............................ | 712/239 |
| 5,875,325 | 2/1999 | Talcott .................................... | 712/240 |

*Primary Examiner*—Kenneth S. Kim
*Attorney, Agent, or Firm*—Fenwick & West LLP

[57] ABSTRACT

A method for a prediction correlation between a first group of branch instructions in a bunch of instructions and a second group of branch instructions in a bunch of instructions is disclosed. The method includes indicating a direction of a plurality of branch instructions in a bunch of instructions. More particularly, the method includes building an address composed of an instruction fetch address and bits in a history register. The method accesses a bunch of instructions using the fetch address and accesses a prediction bits set from a branch history table using the composed address. The accessed bunch of instructions are processed. Further, the history register and the branch history table are updated to correlate a first group of a branch instructions in the accessed bunch of instructions to a second group of branch instructions in a next group of branch instructions in the bunch of instructions.

4 Claims, 7 Drawing Sheets

PREDICTING FOR ALL BRANCH INSTRUCTIONS IN A BUNCH BASED ON HISTORY REGISTER UPDATED ONCE FOR ALL OF ANY TAKEN BRANCHES IN A BUNCH

This application is a division of U.S. Ser. No. 08/998,294, now issued U.S. Pat. No. 5,896,529, filed Dec. 24, 1997 which is a continuation of U.S. Ser. No. 08/601,744, filed Feb. 15, 1997 now issued U.S. Pat. No. 5,742,805, the contents of which are hereby incorporated herein by reference.

FIELD OF INVENTION

The present invention relates to microprocessors and more specifically to the prediction of branch instructions in superscalar microprocessors.

BACKGROUND OF INVENTION

Conventional microprocessors which do not use a superscalar or multipipelined architecture accept instructions from a serial instruction stream, and process those instructions sequentially, in a logical order allowing jumps and branches. When a conditional branch instruction is encountered, the microprocessor tests certain flags which have been set by instructions previously executed by the microprocessor, and either resumes executing at the instruction which followed the conditional branch instruction in the serial instruction stream, or resumes execution at an instruction stored at a location described by the conditional branch instruction.

Superscalar microprocessors can accept a serial instruction stream, and produce the same results as a non superscalar microprocessor. However, superscalar microprocessors may internally process multiple instructions simultaneously, which may cause instructions to be executed out of their logical order, the order intended by the original creator of the instructions.

Referring now to FIG. 1, a conventional superscalar microprocessor 102 and memory 104 is shown. Fetch circuitry 106 directs memory 104 to transfer blocks of instructions 110, 112 starting with the memory address contained in the fetch program counter 108 a block at a time into memory area 114, for simultaneous processing by execution units 116, 118, 120. Although the size of the blocks 110, 112 and memory area 114 shown in FIG. 1 are four words, and the number of execution units 116, 118, 120 shown in FIG. 1 is three, conventional superscalar microprocessors may have blocks 110, 112 and storage areas 114 of any size, and any number of execution units 116, 118, 120.

Producing results in a superscalar microprocessor which are identical to the results which would be produced by a conventional non-superscalar microprocessor poses certain problems for a superscalar microprocessor. One problem posed by a superscalar microprocessor design arises in the processing of a conditional branch instruction. Because the instructions which set the flags in a superscalar microprocessor may not have been processed at the time the branch instruction is ready for execution by the superscalar microprocessor, it is impossible to determine with certainty which instruction the non-superscalar microprocessor would have-executed after the execution of the conditional branch instruction without waiting for all instructions which logically precede the conditional branch instruction to execute. Waiting for all such preceding instructions to execute would introduce undesirable delays.

One approach to avoid these delays has been to attempt to predict the result of the conditional branch instruction without waiting for the logically preceding instructions to execute, and continue processing instructions as if the prediction was accurate. When the instructions which logically precede the conditional branch have all completed execution, the prediction may be tested for accuracy. If the result of the branch prediction is indeed accurate, processing continues and the undesirable delays are avoided. If the result of the branch prediction is inaccurate, processing stops, and resumes at the instruction which should have been executed after the conditional branch, with the delay no greater than if processing had suspended waiting for execution of the instructions which logically preceded the conditional branch instruction.

Various conventional ideas exist for predicting which branch direction to take. One approach is to always predict the branch described in the branch instruction will be taken. Such a prediction can often be correct more than fifty percent of the time, as many programs contain loop instructions that result in the branch described in the branch instruction being taken more often than not. For example, the PASCAL instructions:

For i := 1 to 100 do begin

...

end;

cause the branch described in the branch instruction to be taken 99 percent of the time. Of course, other instructions, such as if . . . then, while . . . do, and repeat . . . until may not yield the same prediction accuracy, but the scheme is relatively simple to implement, saving valuable area in a superscalar microprocessor 102.

When an instruction described in the conditional branch instruction is executed following the conditional branch instruction, the action is described as "taking the branch" and thus, the branch or "direction" of the branch is "taken". When the instruction which physically follows the branch instruction is executed because the conditions of the conditional branch instruction were not true, the action is described as "not taking the branch" and the branch or "direction" of the branch is described as "not taken."

One idea which can improve the accuracy of branch prediction is known as "bimodal" branch prediction and involves the use of a two-bit saturating counter as a prediction indicator to indicate whether a branch should be taken. A two bit saturating counter makes use of the assumption that branches should be taken in groups, and so whether a branch or group of branches should be taken may be predicted by reference to whether the last branch or branches were taken. Referring now to FIGS. 2A and 2B, an illustration of a state table of a two-bit saturating counter is shown. State 210 represents a strong indication that the branch should not be taken. State 212 represents a weak indication that the branch should not be taken. State 214 represents a weak indication that the branch should be taken. State 216 represents a strong indication that the branch should be taken. The state of the prediction may be initialized to any state 210, 212, 214, 216. The branch is predicted taken if the most significant bit of the current prediction state has a value of "1", such as states 214, 216, and the branch is predicted not taken if the most significant bit in the current prediction state has a value of "0", such as states 210, 212. When the prediction is tested after the instructions logically preceding the branch have been executed, the state of the prediction is changed according to table 218. Column 220 represents the current state, column 222 represents the new state, and column 224 represents the actual branch action: taken, meaning the branch was actually taken, or not taken, meaning the branch was not actually taken. From a strong indication, two actual branches opposite the indication are required before a change is made to the branch prediction. Other arrangements of counters, including those with more than two bits, may be utilized to vary the number of actual branches opposite the strong indication required to change the prediction.

The states of FIG. 2A may also have the values opposite those shown: strong taken, weak taken, weak not taken and strong not taken for states 210, 212, 214, 216, respectively. In this case, the most significant bit having a value of "1" indicates the branch should be predicted not taken, "0" indicates the branch should be predicted taken. Table 218 of FIG. 2B is used as described above, with the opposite actual actions in column 224.

The accuracy of bimodal branch prediction may be enhanced through the use of a history register, which records the history of the actual branch action taken. The use of a history register assumes that conditional branches are taken according to repeating patterns. For example, in the following PASCAL program:

```
For i := 1 to 100 do
    For j := 1 to 3 do begin
    ...
    end;
``` the inner branch will be taken two times, but not the third, followed by the outer branch taking its branch, behavior which will be repeated ninety-eight times due to the outer branch. Knowledge of the behavior of the last four branches of both the inner and outer branch can predict the behavior of the next branch with higher accuracy than bimodal branch prediction. A shift register may be used as a history register to keep track of the behavior of the branches by shifting bits one position in a single direction (right or left) for each branch encountered, shifting in a "1" for each branch that is actually taken, and shifting in a "0" for each branch that is not actually taken. For example, a lest shift register would read 1101 after the outer branch was taken, with the zero in the second least significant position showing that the end of the inner loop had been reached. The next branch should be predicted taken, as it will be the first branch in the next iteration of the inner loop.

The history register is used with a history table and the two-bit saturating counters of bimodal branch prediction to complete the prediction. Referring now to FIG. 3, the contents of a history register 308 as described above are used as an index to a history table 312. The pointer 316 having the same index 314 as that of history register 308 points to a two-bit saturating counter 318, 320, 322, 324, 326 having a state table as described above with reference to FIG. 2A which is used to determine the branch prediction as described above. The entire history register 308 may be used as an index to the table 312, or a certain number of bits including and adjacent to the bit most recently shifted in to the history register 308 may be used as an index to the table 312.

Another method is similar to the history table method described above, except that the address of all, or a certain number of the least significant bits, of the address of the conditional branch instruction are used in place of the history register 308 as the index to the table 312.

Still other methods combine the low order bits of the address of the conditional branch instruction and some or all of the branch history, for example by concatenation or exclusive-OR-ing, to create an index to the table 312, in place of the history register 308 alone.

Referring again to FIG. 1, if the address of the conditional branch instruction is used to create the index, the address must be computed from the fetch program counter register 108 and the position of the conditional branch instruction in the memory 114, causing added complexity of the microprocessor 102 and computational delay. If the history is used to create the index, it must be updated for each conditional branch instruction executed, resulting in additional complexity in the design of the microprocessor 102.

SUMMARY OF INVENTION

A method and apparatus predicts whether each conditional branch instruction in a bunch of instructions retrieved from a block of memory should be taken using a table of pointers to an array of two-bit saturating counters. For each conditional branch instruction in the bunch, the index to the table is derived from the least significant bits of an address of the same one of the bytes in the block appended to, or otherwise combined with a history register, which is updated only once for the bunch by shifting in a "1" if any of the branches in the bunch were actually taken, "0" otherwise. Because the index does not require the computation of the exact memory location of each conditional branch instruction, the time and complexity required to determine the index is reduced. Because the history table is updated only once for the bunch, instead of once for each conditional branch instruction in the bunch, complexity is further reduced.

DETAILED DESCRIPTION OF A PREFERRED EMBODIMENT

Figure 4A:
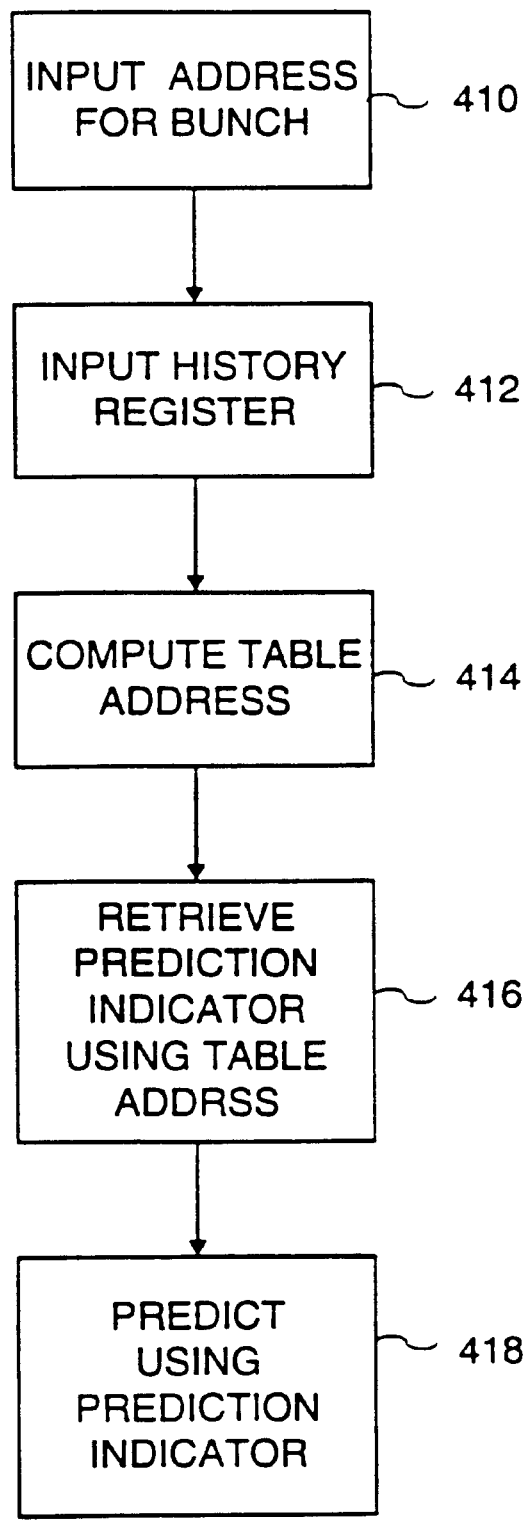
FIG. 4A is a flowchart illustrating a method of predicting a conditional branch according to one embodiment of the present invention.

Referring now to FIG. 4A, a flowchart illustrating a method of predicting a conditional branch instruction in a bunch of several instructions according to the present invention is shown. A portion or all of a storage address for one of the instructions in the bunch is identified 410. In one embodiment, this address is the memory address of the first byte of the first instruction of the bunch of instructions. Other embodiments use the address of other bytes of the first or other instructions in the bunch, or another identifier unique to the bunch.

Some or all of a history register is retrieved 412 for use as described below. The history register may be retrieved 412 after, prior to, or at substantially the same time as the storage address is retrieved 410. The history register may be initialized to any value, such as all zeros, and updated as described in FIG. 4B below.

A prediction table address is computed using the history register and the storage address of one of the instructions in the bunch 414. In one embodiment, the table address is a concatenation formed by placing the entire history register in the most or least significant table address bit positions and a certain number of least significant bits of the storage address of one of the instructions in the bunch in the remaining table address bit positions. In another embodiment, the table address is a concatenation of a certain number of the history register bits in the most or least significant table address bit positions and a certain number of least significant bits of the storage address of one of the instructions in the bunch in the remaining table address bit positions. In one embodiment, the history register is updated by shifting a bit into the least significant bit position of the history register, the four least significant bits of the history register are placed into the four most significant table address bit positions, and the eight least significant bits of the address of the first instruction in the bunch of instructions are placed into the remaining eight least significant table address bits to form a twelve bit table address.

In one of the embodiments described above, the bits of the address of one of the bytes of the instructions in the bunch to be concatenated are the least significant bits of the address and the bits of the history register to be concatenated are the history register bits including and adjacent to the bit most recently shifted in.

In another embodiment, the history register is used without the address of one of the bytes of the instructions in the bunch to compute the table address. In another embodiment, the address of one of the bytes of the instructions in the bunch is used without the history register to compute the table address.

The cable address can also be computed using the history register and the address of one of the bytes of an instruction in the bunch using methods other than concatenation. In another embodiment, some or all of the bits of the history register and some or all of the bits of the address of one of the bytes of the instructions in the bunch are exclusive-OR-ed to create a history table. In one embodiment, the bits of the address of one of the bytes of the instructions in the bunch to be exclusive-OR-ed are the least significant bits of the address, and the bits of the history register to be exclusive-OR-ed are the history register bits including and adjacent to the bit most recently shifted in.

Figure 2A:
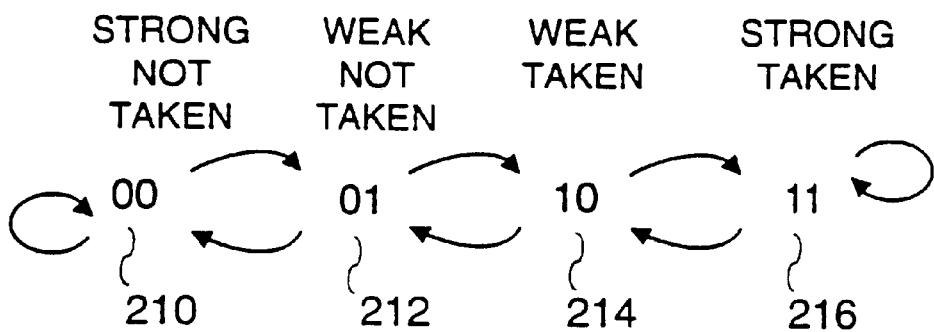
FIG. 2A is a state diagram of a conventional two-bit saturating counter.

The table address may then be used to retrieve a portion or all of a prediction indicator 416. In one embodiment, the prediction indicator is located at the table address in a table of prediction indicators. In another embodiment, the prediction indicator is located via a pointer at the table address. The prediction is made according to the prediction indicator retrieved. In one embodiment, each prediction indicator acts as a two-bit counter, such as the two-bit saturating counter described above and having the state table illustrated in FIG. 2A, with the conditional branch predicted taken if the most significant bit of the two-bit saturating counter corresponding to the table address has one value such as a "1" 214, 216 and predicted not taken if the most significant bit of the two-bit saturating counter corresponding to the table address has the opposite value, such as a "0" 210, 212. A single prediction derived using this method may be performed once and used for every conditional branch in the bunch.

Figure 2B:
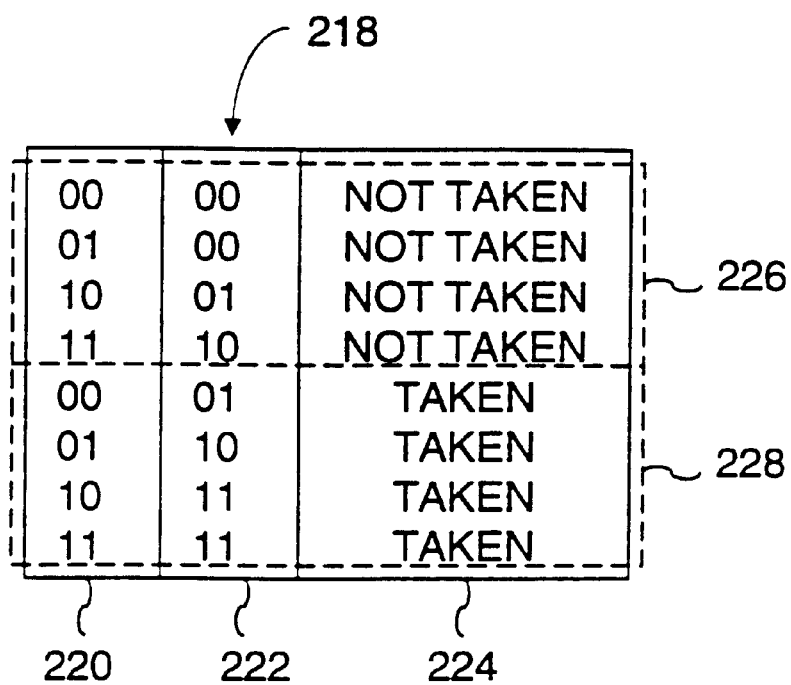
FIG. 2B is a state table illustrating the operation of a conventional two-bit saturating counter described by FIG. 2A.
Figure 3:
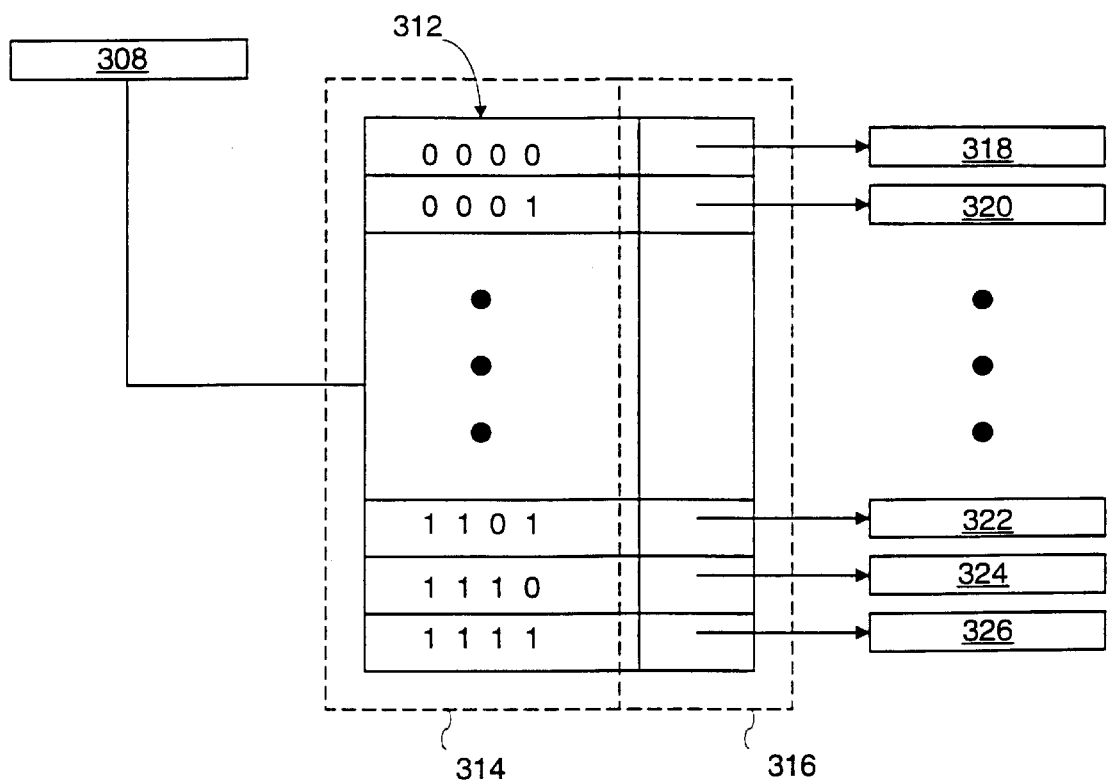
FIG. 3 is a block schematic diagram of a conventional branch predictor utilizing a table.
Figure 4B:
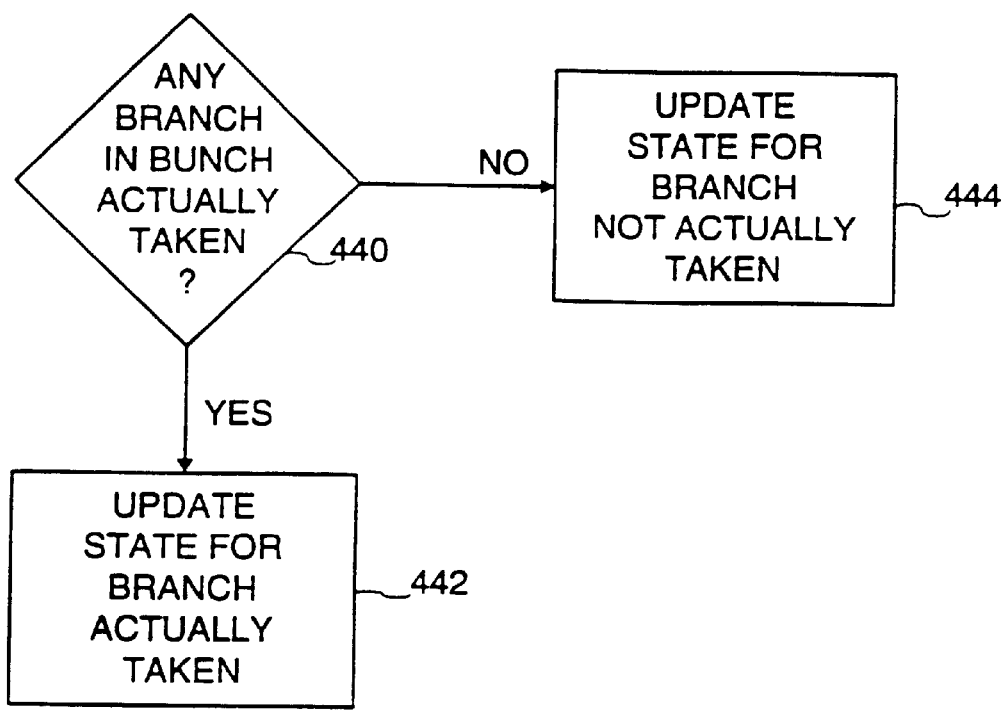
FIG. 4B is a flowchart illustrating a method of updating a prediction indicator according to one embodiment of the present invention.

Optionally, the prediction indicator may be updated based on whether any branch in the bunch was actually taken, using a method such as the method described above using FIG. 2B. Referring now to FIGS. 4B and 2B, if any branch in the bunch is actually taken, the state of the prediction indicator is updated using the lower portion 228 of table 218. If no branches in the bunch are actually taken, the prediction indicator is updated using the upper portion 226 of table 218.

Figure 4C:
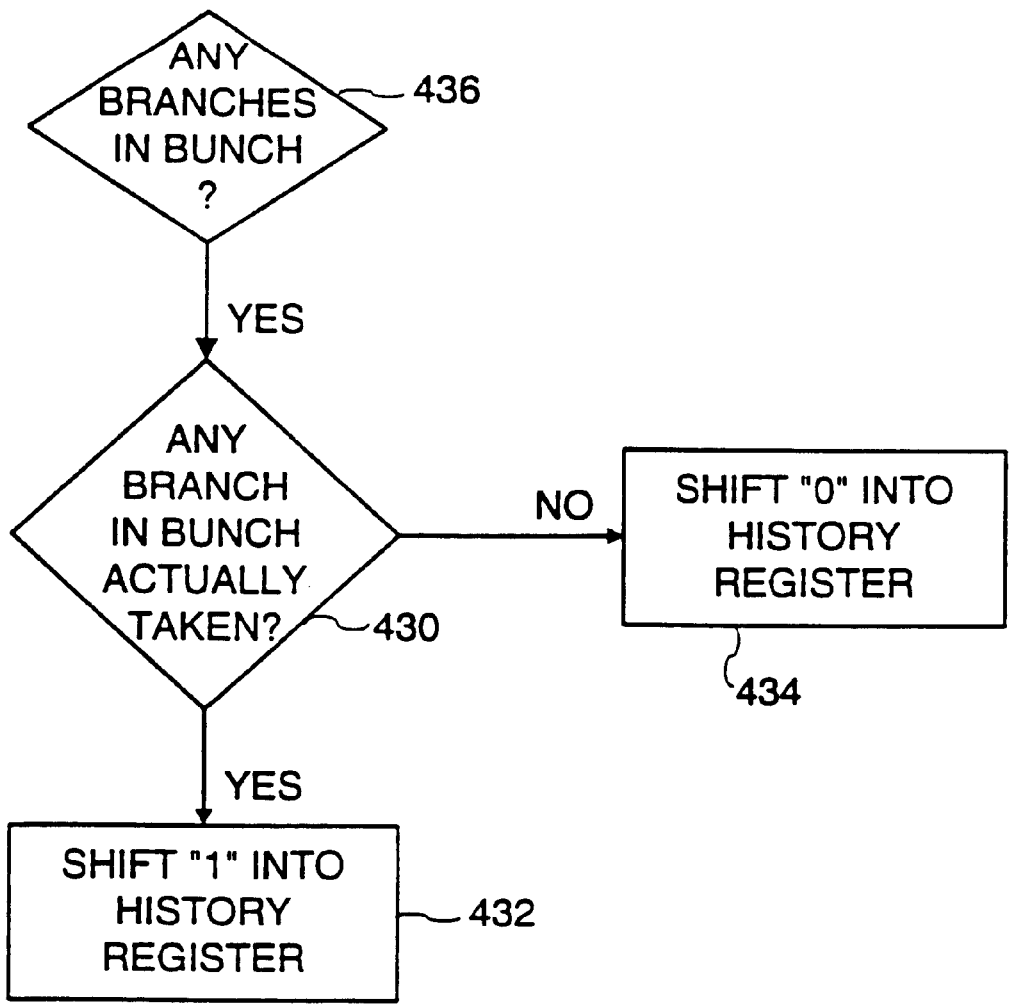
FIG. 4C is a flowchart illustrating a method of updating a history register according to one embodiment of the present invention.

In one embodiment, the history register is updated once for each bunch of instructions, after all predictions for branch instructions in the bunch have been made. In one embodiment, the history register is updated as shown in FIG. 4C. If any branch in the bunch was actually taken 430, a value such as a "1" is shifted into the history register 432, otherwise, if no branches in the bunch were actually taken, the opposite value, such as a "0" is shifted into the history register 434. Bits may be shifted into the history register from either direction as long as the direction of shifts is consistent among a large number of bunches.

In one embodiment, the history register is only updated if there is a conditional branch instruction in the bunch 436. This embodiment allows a history register of a certain size to track a longer history than a history register which is updated even for bunches which do not contain conditional branch instructions as described above.

Figure 1:
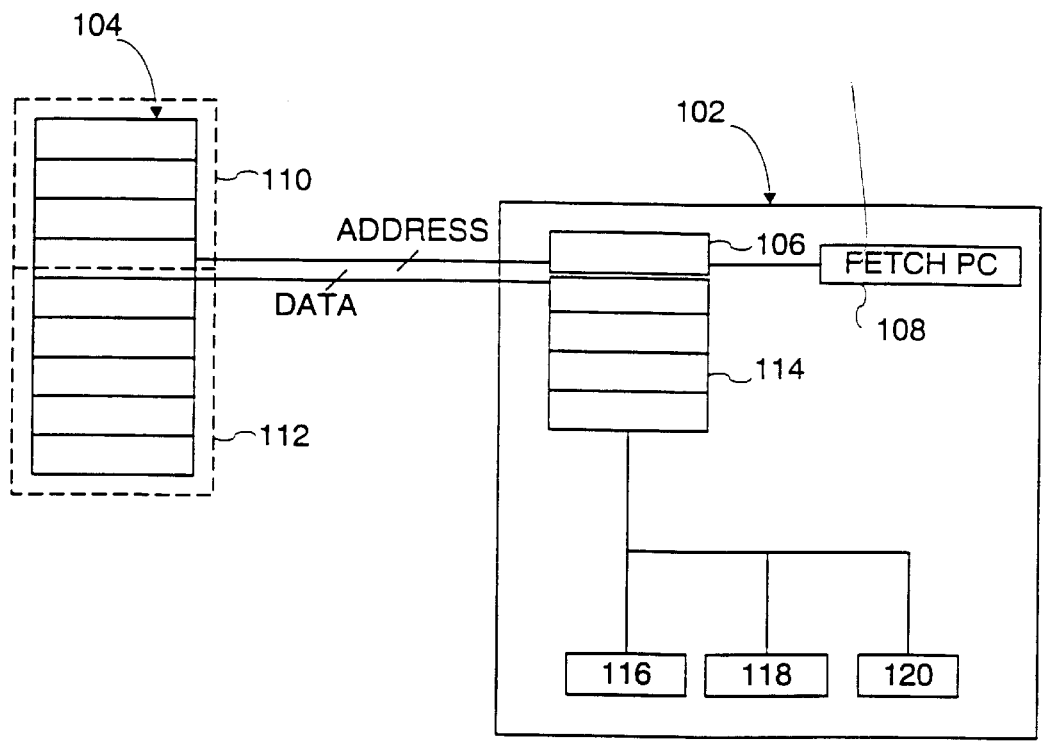
FIG. 1 is a block schematic diagram of a conventional superscalar microprocessor and a conventional memory.
Figure 5:
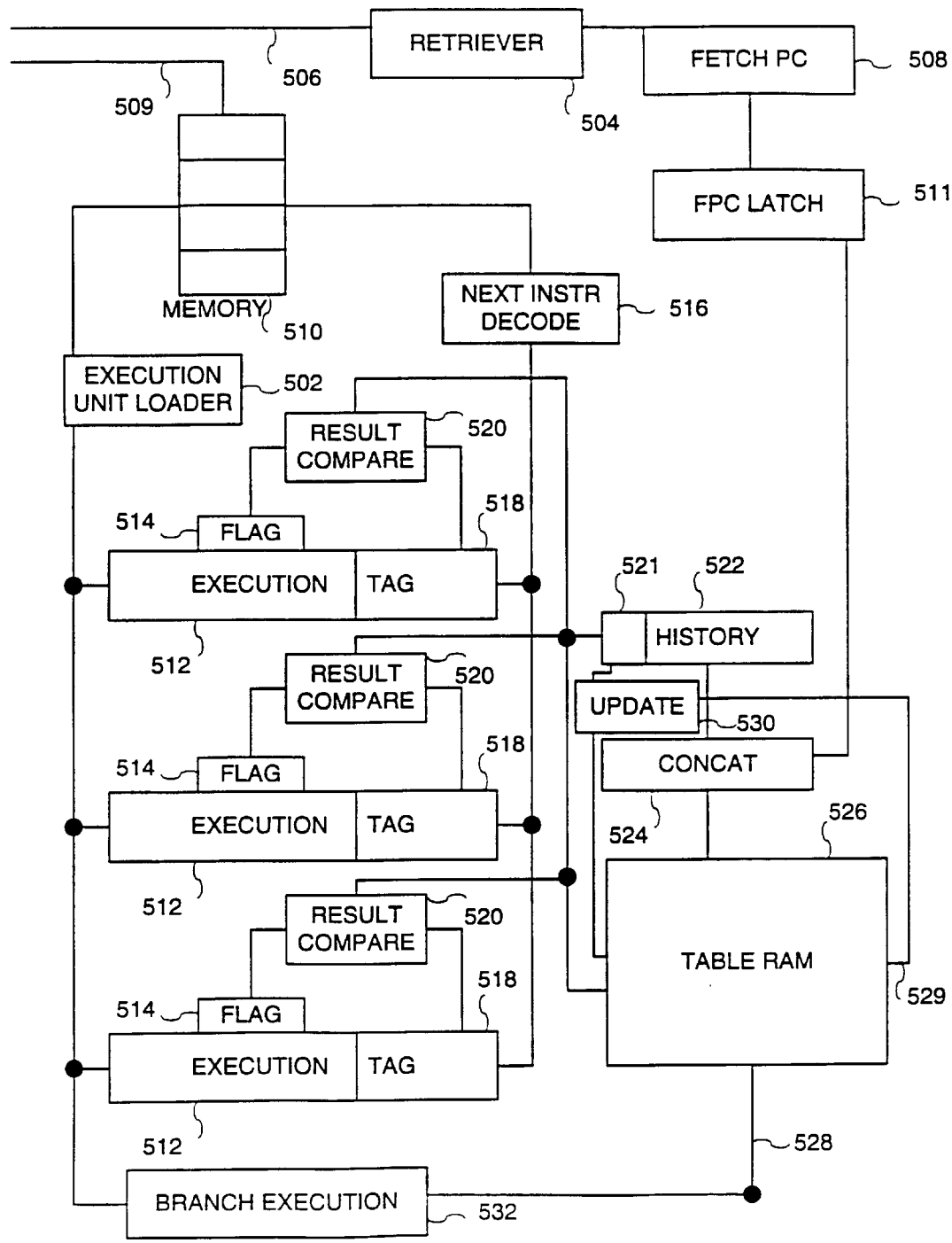
FIG. 5 is a block schematic diagram of conditional branch prediction circuitry in a superscalar microprocessor according to one embodiment of the present invention.

Referring now to FIG. 5, one embodiment of an apparatus used to predict conditional branch instructions according to the present invention is shown. Fetch program counter 508 holds the storage address of the first instruction of a bunch of instructions stored in a storage device such as a memory, not shown on FIG. 5, but similar to memory 104 of FIG. 1. Retriever 504 addresses such storage device via address bus 506 to retrieve a certain number of instruction bytes from such storage device via data bus 509 into memory 510. Execution unit loader 502 loads instructions stored in memory 510 into execution units 512. Next instruction decode 516 appends a tag into tag storage 518 if the instruction stored in memory 510 following the instruction loaded into execution unit 512 is a conditional branch instruction. The tag stored in tag storage 518 is made up of a number of bits, each bit corresponding to the condition or conditions which must be met for the conditional branch instruction stored in memory 510 following the instruction in the respective execution unit 512 to take the branch. One or more execution units 512 each contain a flag register 514 which sets condition flag bits in the flag register 514 based upon the results produced by the execution unit 512. Each bit in flag register 514 corresponds to conditions such as "result=0", "result>0" or "result<0". Result compare 520 compares the flag bits in flag register 514 with the tag bits stored in tag storage 518. If all of the tag bits in tag storage 518 match the corresponding set flag bits in flag register 514, result compare 520 outputs true to history latch 521, indicating that the conditions for one of the conditional branches in the bunch to take the branch has actually occurred. History latch 521 is shifted into history register 522, after all of the instructions preceding conditional branch instructions in the bunch have been executed by execution units 512.

FPC latch 511 is coupled to the fetch program counter 508 to preserve the value of some or all of the bits contained in the fetch program counter 508. The contents of history register 522 is concatenated with the contents of FPC latch 511 in the combination or fashion as described above via concatenator 524 to address table RAM 526 which contains a table of two-bit saturating counters as described above. In one embodiment concatenator 524 concatenates bits of the history register 522 and the bunch address contained in FPC latch 511. In another embodiment, concatenator 524 exclusive-ORs the bits as described above. The most significant bit of the two-bit saturating counters of table RAM 526 is output on output line 528 to branch execution unit 532 to indicate to the branch execution unit 532 whether to take any branch in the bunch loaded into memory 510 as described above.

Update unit 530 is coupled to history latch 521 and table RAM output 529 to receive both bits stored in the two-bit saturating counter addressed by concatenator 524. Update unit 530 updates the two-bit saturating counter in table RAM 526 using the values illustrated in FIG. 2B. Update unit 530 updates the table RAM after all non-branch instructions stored in memory 510 corresponding to the instructions loaded by the fetch program counter 508 corresponding to the bits stored in FPC latch 511. This means the update unit 530 updates a single address of table RAM 526 corresponding to the table RAM address output by concatenator 524 once for each time instructions are loaded into memory 510. Other arrangements for loading memory 510 are possible, such as a double buffer arrangement whereby pointers are used to correspond to memory 510, one pointer points to the next location in memory 510 into which instructions are to be loaded and one pointer points to the next location in memory 510 from which instructions are to be transferred to execution units 512. In such an arrangement, update unit 530 updates the two-bit counter in table RAM 526 corresponding to the address at the output of concatenator 524 one time for each time all instructions which had been in memory 510 at one time have been executed.

What is claimed is:

1. A method of updating a history register comprising a plurality of bits, each having a first value and a second value, to maintain the conditional branch history of one of a plurality of bunches of instructions comprising a plurality of instructions, at least one bunch of instructions including at least one conditional branch instruction, each conditional branch instruction having an actual taken state being selectable from a first state and a second state, the method comprising:

determining the presence of at least one of the conditional branch instructions in the bunch of instructions having an actual taken state of the first state;

responsive to the presence of at least one of the conditional branch instructions in the bunch of instructions having an actual taken state of the first state, shifting the first value into the history register;

responsive to the absence of at least one conditional branch instructions in the bunch of instructions having an actual taken state of the first state, shifting the second value into the history register; and making branch predictions for all conditional branch instructions in the bunch of instructions based upon contents of the history register.

2. The method of claim 1 comprising the additional steps of, for at least one instruction in the bunch:

determining whether a conditional branch instruction was actually taken;

responsive to the conditional branch instruction having been actually taken, selecting the actual taken state of the first state; and responsive to the conditional branch instruction having not actually been taken, selecting the actual taken state of said branch of the second state.

3. A method of updating a history register comprising a plurality of bits having a first value and a second value to maintain the conditional branch history of one of a plurality of bunches of instructions comprising a plurality of instructions, at least one bunch of instructions including a plurality of conditional branch instructions, each conditional branch instruction having an actual taken state being selectable from a first state and a second state, the method comprising:

determining the presence of a conditional branch instruction in the bunch of instructions; and responsive to the presence of a conditional branch instruction in the bunch of instructions:

determining the presence of one of the conditional branch instructions in the bunch of instructions having an actual taken state of the first state;

responsive to the presence of at least one of the conditional branch instructions in the bunch of instructions having an actual taken state of the first state, shifting the first value into the history register;

responsive to the absence of at least one conditional branch instructions in the bunch of instructions having an actual state of the first state, shifting the second value into the history register; and making branch predictions for all conditional branch instructions in the bunch of instructions based upon contents of the history register.

4. The method of claim 3 comprising the additional steps of, for at least one instruction in the bunch:

determining whether a conditional branch instruction was actually taken;

responsive to the conditional branch instruction having been actually taken, selecting the actual taken state of the first state; and responsive to the conditional branch instruction having not actually been taken, selecting the actual taken state of said branch of the second state.

* * * * *